(12) United States Patent
Brar et al.

(10) Patent No.: US 11,966,144 B2
(45) Date of Patent: Apr. 23, 2024

(54) TUNABLE DIELECTRIC RESONATORS FOR FREESPACE LIGHT INTENSITY MODULATION

(71) Applicant: Wisconsin Alumni Research Foundation, Madison, WI (US)

(72) Inventors: Victor Brar, Madison, WI (US); Seyoon Kim, Madison, WI (US)

(73) Assignee: Wiconsin ALumni Research Foundation, Madison, WI (US)

( * ) Notice: Subject to any disclaimer, the term of this patent is extended or adjusted under 35 U.S.C. 154(b) by 91 days.

(21) Appl. No.: 17/857,346

(22) Filed: Jul. 5, 2022

(65) Prior Publication Data

US 2024/0012307 A1    Jan. 11, 2024

(51) Int. Cl.
| | | |
|---|---|---|
| H04B 10/00 | (2013.01) | |
| G02F 1/01 | (2006.01) | |
| G02F 1/17 | (2019.01) | |

(52) U.S. Cl.
CPC ............... *G02F 1/17* (2013.01); *G02F 1/011* (2013.01)

(58) Field of Classification Search
CPC .................................. G02F 1/17; G02F 1/011
See application file for complete search history.

(56) References Cited

U.S. PATENT DOCUMENTS

| | | | | |
|---|---|---|---|---|
| 5,023,685 | A * | 6/1991 | Bethea | H01L 27/14868 |
| | | | | 257/E27.152 |
| 6,211,529 | B1 * | 4/2001 | Gunapala | B82Y 20/00 |
| | | | | 257/17 |
| 10,505,334 | B2 * | 12/2019 | Yang | H01J 23/06 |
| 11,314,145 | B1 * | 4/2022 | Sarma | G02F 1/37 |
| 2016/0351807 | A1 * | 12/2016 | Scheibner | H01L 29/475 |
| 2018/0287329 | A1 * | 10/2018 | Yang | H01J 7/44 |
| 2022/0381950 | A1 * | 12/2022 | Alù | G02B 5/3033 |
| 2022/0382117 | A1 * | 12/2022 | Jang | G02F 1/218 |
| 2023/0246416 | A1 * | 8/2023 | Park | H01S 5/141 |
| | | | | 372/92 |
| 2023/0344199 | A1 * | 10/2023 | Ollanik | H01S 5/2031 |

OTHER PUBLICATIONS

Bulgakov, Evgeny N., and Dmitrii N. Maksimov. "Avoided crossings and bound states in the continuum in low-contrast dielectric gratings." Physical Review A 98.5 (2018): 053840.
Krasikov, S. D., A. A. Bogdanov, and I. V. Iorsh. "Nonlinear bound states in the continuum of a one-dimensional photonic crystal slab." Physical Review B 97.22 (2018): 224309.

(Continued)

*Primary Examiner* — Agustin Bello
(74) *Attorney, Agent, or Firm* — Bell & Manning, LLC

(57) ABSTRACT

Tunable dielectric resonators for the modulation of freespace radiation and methods of using the resonators are provided. The dielectric resonators include a planar waveguide that supports a vertical Fabry-Perot resonance, a grating that supports a qBIC resonance, and a radiation absorbing material having an electronically or thermally tunable absorption at the qBIC resonant frequency. Using this resonator design, the intensity of the transmission and reflection of the qBIC resonance can be modulated by modulating the absorption properties of the absorbing material at the qBIC resonant frequency.

14 Claims, 10 Drawing Sheets

(56) References Cited

OTHER PUBLICATIONS

Bykov, Dmitry A., Evgeni A. Bezus, and Leonid L. Doskolovich. "Coupled-wave formalism for bound states in the continuum in guided-mode resonant gratings." Physical Review A 99.6 (2019): 063805.

Maksimov, Dmitrii N., Andrey A. Bogdanov, and Evgeny N. Bulgakov. "Optical bistability with bound states in the continuum in dielectric gratings." Physical Review A 102.3 (2020): 033511.

Overvig, Adam C., Sajan Shrestha, and Nanfang Yu. "Dimerized high contrast gratings." Nanophotonics 7.6 (2018): 1157-1168.

Raghunathan, Varun, et al. "Nonlinear optics in dielectric guided-mode resonant structures and resonant metasurfaces." Micromachines 11.4 (2020): 449.

Lee, Sangjun, Joohyung Song, and Sangin Kim. "Graphene perfect absorber with loss adaptive Q-factor control function enabled by quasi-bound states in the continuum." Scientific reports 11.1 (2021): 1-8.

Joseph, Shereena, et al. "Bound states in the continuum in resonant nanostructures: an overview of engineered materials for tailored applications." Nanophotonics (2021).

Koshelev, Kirill, Andrey Bogdanov, and Yuri Kivshar. "Engineering with bound states in the continuum." Optics and Photonics News 31.1 (2020): 38-45.

Limonov, Mikhail F., et al. "Fano resonances in photonics." Nature Photonics 11.9 (2017): 543-554.

Klopfer, Elissa, et al. "High-Quality-Factor Silicon-on-Lithium Niobate Metasurfaces for Electro-optically Reconfigurable Wavefront Shaping." Nano Letters 22.4 (2022): 1703-1709.

Wang, Xing, et al. "Controlling light absorption of graphene at critical coupling through magnetic dipole quasi-bound states in the continuum resonance." Physical Review B 102.15 (2020): 155432.

Argyropoulos, Christos. "Enhanced transmission modulation based on dielectric metasurfaces loaded with graphene." Optics express 23.18 (2015): 23787-23797.

Wu, Bing-Ru, et al. "Quasi-Bound States in the Continuum with Temperature-Tunable Q Factors and Critical Coupling Point at Brewster's Angle." Laser & Photonics Reviews 15.5 (2021): 2000290.

Wang, Hong, et al. "Active tuning of near-infrared electromagnetic responses in the graphene/silicon hybrid nanohole arrays by electrical control." Physical Review B 105.3 (2022): 035407.

Zhang, Chen, et al. "Stretchable all-dielectric metasurfaces with polarization-insensitive and full-spectrum response." ACS nano 14.2 (2019): 1418-1426.

Salary, Mohammad Mahdi, and Hossein Mosallaei. "Tunable all-dielectric metasurfaces for phase-only modulation of transmitted light based on quasi-bound states in the continuum." ACS Photonics 7.7 (2020): 1813-1829.

Koshelev, Kirill, et al. "Asymmetric metasurfaces with high-Q resonances governed by bound states in the continuum." Physical review letters 121.19 (2018): 193903.

Kim, Seyoon, et al. "Electrical Modulation of High-Q Guided-Mode Resonances Using Graphene." Carbon Trends (2022): 100185.

* cited by examiner

TUNABLE DIELECTRIC RESONATORS FOR FREESPACE LIGHT INTENSITY MODULATION

BACKGROUND

Dielectric resonators have drawn attention since they can behave as low-loss optical scatterers with properties that can be tuned extensively by changing the resonator geometry. Recently, they have been proven to support high-Q resonances in periodically arranged planar structures, one-dimensional arrays, and even in a single resonator. The underlying physics of these high-Q resonances is a phenomenon dubbed quasi-bound states in the continuum (qBICs). Bound states in the continuum (BICs) in optics refer to localized eigenstates lying in a continuous spectrum of radiative modes. However, in general, BICs do not interact with the external continuum states due to the absence of radiative coupling channels. Assuming there is no absorption in the resonators, energy trapped in BICs cannot vanish, and this results in an infinite Q-factor, or an infinite lifetime. In the case of periodically arranged resonators, these BICs can be considered as symmetry protected bound modes which cannot be accessed by the freespace radiation.

To access the symmetry protected BIC optically, one convenient way is to break the symmetry by illuminating with oblique light or by imposing distortions and perturbations upon the resonators. The broken symmetry opens up radiative coupling channels, turning a perfect BIC into a qBIC. The Q-factor of the qBIC mode is determined by the degree of the asymmetry, which dictates the scattering rate. Q-factors as high as approximately 18,500 have been experimentally demonstrated in symmetry-broken all dielectric metasurfaces. (Z. J. Liu, et al., *Phys. Rev. Lett.* 2019, 123, 253901.) Such high Q-factors are preferable to enhance light-matter interactions for lasing, biomolecular sensing, and the observation of nonlinear effects.

Meanwhile, graphene has been regarded as a promising electro-optic material to manipulate light-matter interactions actively, with the tunability it offers being favorable for the creation of next generation nanophotonic devices. One of the most beneficial properties of graphene is that its linear electronic dispersion allows for electrical modulation of optical conductivity and light absorption. In the near-infrared range, the tunable interband absorption in graphene has been utilized to demonstrate active light modulation in integrated waveguides and photonic crystals. In mid-infrared to THz ranges, meanwhile, highly confined plasmons supported in nanostructured graphene exhibit strong gate-dependent resonances that have enabled efficient light modulation including electrically tunable perfect absorption and complex amplitude modulation with metal incorporated plasmonic structures.

SUMMARY

Tunable dielectric resonators for the modulation of freespace radiation and methods of using the resonators are provided.

One embodiment of a dielectric resonator includes: a waveguide comprising a planar dielectric slab; a periodic grating on the planar dielectric slab; and an electronically or thermally gated absorber material on a surface of the dielectric slab. The waveguide supports a vertical Fabry-Perot resonance and the periodic grating supports a qBIC resonance, wherein the supported qBIC resonance has a qBIC resonant frequency corresponding to a peak in the transmission spectrum of the Fabry-Perot resonance. The electronically gated absorber has an electrically or thermally tunable absorption at the qBIC resonant frequency.

One embodiment of a method for modulating the intensity of monochromatic radiation using a dielectric resonator of a type described herein includes the steps of: illuminating the waveguide with free space radiation at normal incidence to excite the vertical Fabry-Perot resonance and a lateral guided wave resonance at the qBIC resonant frequency, wherein the lateral guided mode resonance and the vertical Fabry Perot resonance couple to produce a Fano resonance having a Lorentzian line shape with a minimum transmittance and a maximum reflectance at the qBIC resonant frequency; and adjusting a gate bias on the gated absorber material or adjusting the temperature of the absorber material to modulate the intensity of the qBIC resonance.

Other principal features and advantages of the invention will become apparent to those skilled in the art upon review of the following drawings, the detailed description, and the appended claims.

BRIEF DESCRIPTION OF THE DRAWINGS

Illustrative embodiments of the invention will hereafter be described with reference to the accompanying drawings, wherein like numerals denote like elements.

DETAILED DESCRIPTION

Figure 1A:
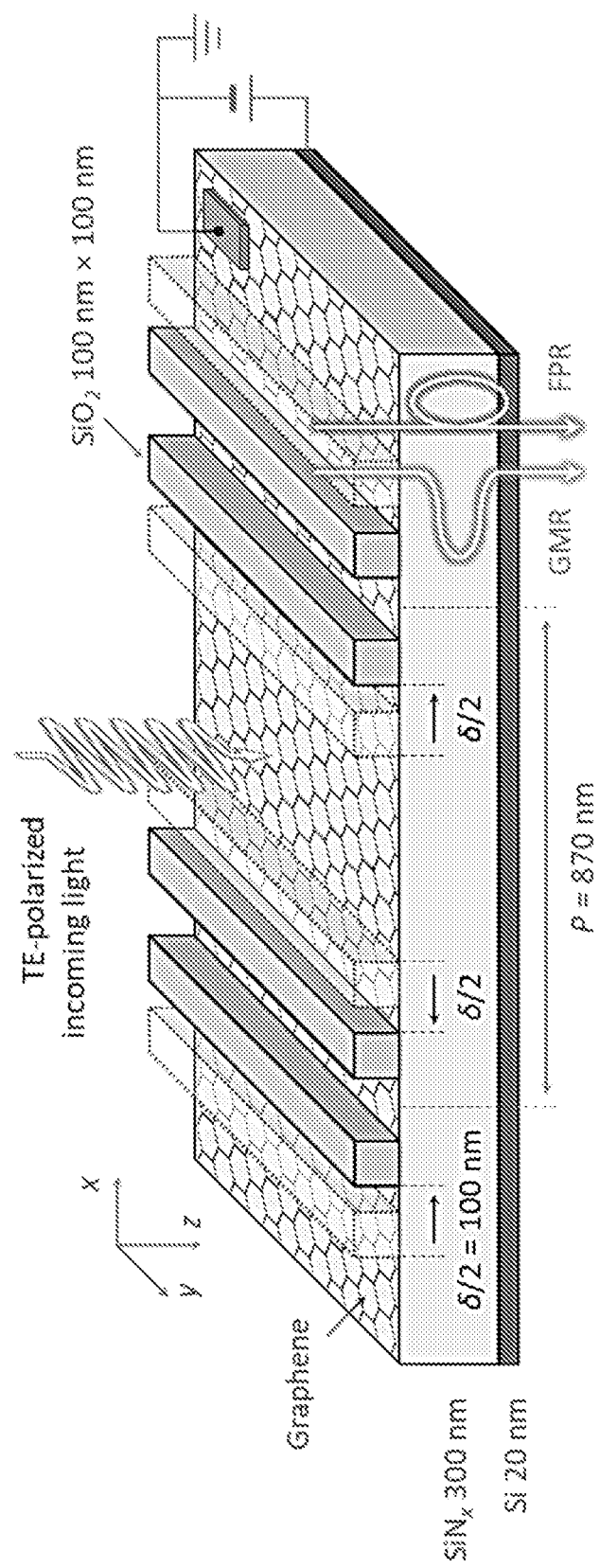
FIG. 1A shows a schematic of a proposed structure to electrically modulate a qBIC resonance, as described in the Example. The $\delta$ denotes the perturbation of a dimerized surface gratings. The GMR and the FPR refer to the guided-mode resonance excited in the lateral direction and the Fabry-Perot resonance supported in the vertical direction, respectively.

Tunable dielectric resonators for the modulation of freespace radiation and methods of using the resonators are provided.

The dielectric resonators modulate the intensity of qBIC resonances that are supported in the resonator. The waveguides include a periodic surface grating that breaks the symmetry of a symmetry protected BIC, opening up a radiative coupling channel and converting the BIC into a qBIC having a characteristic qBIC resonant frequency, which corresponds to the operating frequency of the resonator. When irradiated with freespace radiation at normal incidence, a lateral guided mode resonance (GMR) is excited in the waveguide at the qBIC resonant frequency. This GMR mode couples to a vertical Fabry-Perot resonance supported by the waveguide. The geometry of the dielectric resonator is tailored such that the qBIC resonant frequency of the GMR mode corresponds to the peak in the transmission spectrum of the Fabry-Perot resonance. A radiation absorbing material having an electronically tunable absorption at the qBIC resonant frequency is incorporated into the resonator to modulate the rate of absorption at the qBIC resonant frequency. Using this resonator design, the intensity of the transmission and reflection of the qBIC resonance can be modulated by electrically modulating the absorption properties of the absorbing material. In some embodiments of the dielectric resonators, the transmission of the resonator can be dropped from unity, or near unity, to zero, while the reflection is simultaneously increased from zero to unity, or near unity.

The qBIC resonant frequency of the dielectric resonators can be selected by tailoring the geometry and/or periodicity of the grating elements. Therefore, the dielectric gratings can be designed for use in optoelectronic telecommunications devices, where high-Q resonance and narrow—even single frequency—bandwidths are advantageous. Telecommunications wavelengths include wavelengths in the range from 1 μm to 2 μm. However, the resonators can be designed to operate in other frequency bands for a wide range of applications, such as LIDARs (light detection and ranging) in near-infrared or thermal emitters in mid-infrared, that rely on narrowband freespace light modulation.

The components of an electrically tunable dielectric resonator include a waveguide comprising a planar slab of dielectric material with a symmetry-breaking periodic grating on a surface of the slab. The dielectric material provides a high refractive index longitudinal core of the waveguide, which is disposed between two lower refractive index cladding materials, one or both of which may be air. The grating includes a plurality of grating elements. The shape, dimensions, and periodicity of the grating elements can be tailored to support a qBIC resonance at desired frequency, while the thickness of the waveguide is tailored to provide a Fabry-Perot cavity that supports a Fabry-Perot resonance at the qBIC resonance frequency. A variety of materials can be used for the waveguide, provided that the chosen materials have no, or very low, absorption at the resonant frequency. The supported qBIC resonances are characterized by high Q-factors. By way of illustration only, qBIC resonance with Q-factors of at least 5,000 and at least 10,000 can be achieved.

One illustrative embodiment of an electrically tunable dielectric resonator is shown in FIG. 1A. In this embodiment, the waveguide is formed from a planar slab of silicon nitride with a thin layer of silicon on one surface and a dimerized dielectric surface grating on the opposing surface. (Although silicon nitride is an illustrative dielectric material, other dielectric materials, such as silicon dioxide, aluminum oxide, or silicon, can be used.) The dimerized dielectric surface grating in this embodiment comprises a plurality of transverse linear grating elements running in parallel. In a symmetry-breaking dimerized periodic surface grating, each period of the grating has two nearly identical grating elements (i.e., a dimer) and every other grating element has a perturbation in its lateral displacement or its width. It is these perturbations in the grating structure that support the qBIC resonance. The dimensions provided in the figure are suitable for producing a qBIC with a resonant wavelength of about 1.55 μm, a commonly used telecom frequency, based on the materials illustrated here. It should be understood, however, that different symmetry-breaking grating element periodicities, shapes, and dimensions, including two-dimensional patterns, and different grating and waveguide materials can be used to produce qBIC resonances at this wavelength or at a different wavelength. Thus, the grating elements encompass a variety of sub-wavelength scale elements arranged in a pattern that results in the desired symmetry breaking. By way of illustration, the grating elements used to form the metasurfaces in Koshelev, Kirill, et al. "Asymmetric metasurfaces with high-Q resonances governed by bound states in the continuum." *Physical review letters* 121.19 (2018): 193903 can be used.

A layer of graphene disposed on the surface of the dielectric (e.g., silicon nitride) slab opposite the grating elements is used as a radiation absorbing material in the resonator of FIG. 1A. The absorber material is electronically gated, such that changing a gate voltage applied to the absorber material induces a change in the material's magnitude of absorption at the resonant frequency. Alternatively, the absorber material may be "thermally gated"—meaning that it is in thermal contact with a heat source that is able to change the temperature of the absorber material using a temperature controller, wherein the temperature change induces a change in the material's magnitude of absorption at the resonant frequency. This change in the absorption properties of the absorber material may be due to, for example, a change in the refractive index of the material induced by the change in the temperature. In the resonator of FIG. 1A, the silicon layer is used as a transparent back gate electrode and is connected to a voltage source. However, different gate materials and geometries can be used for gated absorbers. Other absorber materials that undergo a change in refractive index in response to a change in applied bias or a change in temperature include, but are not limited to, indium tin oxide (ITO), indium zinc oxide (IZO), titanium nitride, and vanadium dioxide ($VO_2$), germanium-antimony-tellurium (GST), titanium nitride, and electro-optic polymers. A variety of materials can be used as absorbers and gate electrodes. However, the chosen materials are desirably sufficiently transparent at the operating frequency of the resonator to avoid interference with the operation of the device.

When the waveguide of the dielectric resonator is illuminated at normal incidence with freespace radiation, a lateral guided mode resonance is excited in the waveguide at the qBIC resonant frequency. (As illustrated in FIG. 1A, normal incidence corresponds to the z-axis, which is also referred to herein as the vertical direction.) The guided mode resonance is spectrally aligned with the Fabry-Perot resonance, such that the qBIC resonant frequency corresponds to the peak in the transmission spectrum of the Fabry-Perot resonance, where the transmission spectrum is the transmission as a function of wavelength. Under these conditions and in the absence of absorption by the absorber material, the interaction between the guided mode resonance and the Fabry-Perot resonance creates a Fano resonance having a Lorentzian line shape with a reflection maximum and a transmission minimum at the qBIC resonant frequency. This produces a resonator with a large depth of intensity modulation. In some embodiments, the resonators have perfect (i.e., to unity to zero and vice versa), or nearly perfect, depth of modulation for both the transmission and reflection, as illustrated in the Example.

The absorber material is characterized in that it has a zero, or near zero, absorption rate at the qBIC resonant frequency at a given bias voltage. When the absorber material has a zero, or near zero, absorbance, the scattering rate of the qBIC resonance dominates the absorption rate and the transmission and reflection of the resonator are not significantly affected by the absorber. As the gated absorber is tuned away from this given bias voltage, however, the absorption rate of the absorber material at qBIC resonant frequency increases until it dominates the scattering rate of the qBIC resonance. (For the purposes of this disclosure, a near zero absorption rate is an absorption rate that is sufficiently low that the Lorentzian line shape of the Fano resonance that is produced by the interference of the lateral guided mode resonance and the vertical Fabry-Perot resonance is maintained even in the presence of the absorber material.)

As a result of the increased absorption by the absorber material, the qBIC resonance is damped and the transmission and reflection of the dielectric resonator change rapidly, with the reflection transitioning from a maximum to a minimum, while the transmission transitions from a minimum to a maximum. The increase in the absorption rate need not be large; even a relatively small increase in absorption rate may be enough to collapse the qBIC resonance. Thus, the electrically gated absorber material provides the dielectric resonator with tunable, gate-dependent absorption, transmission, and reflection.

Notably, because the absorber material in the dielectric resonators is used to modulate a qBIC resonance that is supported in the resonator, independently of the absorber material, rather than to support the qBIC resonance, the absorber material in the resonators does not need to be a zero-loss material or to have a high carrier mobility. Therefore, even relatively low-quality layers of the absorber material, such as chemical vapor deposited (CVD) graphene can be used.

Example

This Example illustrates one embodiment of a resonator for the electrical modulation of a qBIC that operates at telecom frequencies by using graphene to control the absorption rate of a qBIC resonance. In the resonator, surface gratings were utilized on a suspended dielectric waveguide to support a qBIC that would provide the base high-Q resonance, while graphene was incorporated to tailor its optical responses. In this configuration, the surface gratings were dimerized for the excitation of a guided-mode resonance in the lateral direction that introduced a radiative coupling channel for the qBIC resonance, with the degree of the dimerization, or the perturbation, determining the scattering rate. (A. C. Overvig et al., Nanophotonics 2018, 7, 1157; Q. J. Song, et al., Phys. Rev. A 2019, 100, 023810.) To electrically modulate and suppress the high-Q resonance, tunable interband absorption in graphene was employed to engineer the absorption rate of the qBIC resonance.

Results and Discussion

The modulation strategy displayed two important benefits. First, nearly perfect light modulation in both transmission and reflection was simultaneously achievable. The guided-mode resonance was tailored so that the qBIC was spectrally aligned with the Fabry-Perot resonance supported vertically inside the suspended dielectric waveguide. This configuration ensured maximal modulation depth as the transmission and the reflection were both pushed to the extremities at the qBIC resonance. Second, the switching performance was not limited by the graphene quality, i.e., graphene carrier mobility. This behavior was unlike graphene plasmonic light modulators and was due to the fact that, here, the graphene was mainly utilized to govern the absorption rate in the resonance, not to produce optical resonant responses.

Figure 1B:
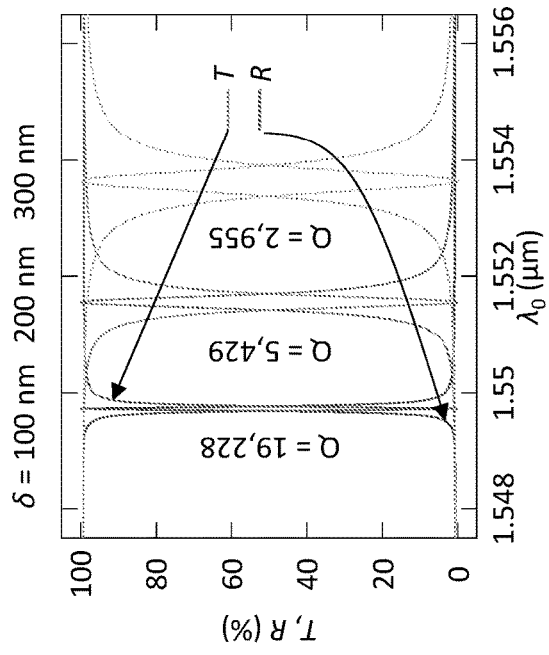
FIG. 1B shows transmission (T) and reflection (R) spectra without perturbation ($\delta=0$ nm) supporting a maximum Fabry-Perot resonance at around $2\lambda_0=1.55$ μm, where $\lambda_0$ corresponds to the freespace wavelength.

FIG. 1A illustrates the basic schematic to modulate the qBIC resonance electrically. It included a suspended waveguide (the $SiN_x$ and the bottom Si layers), surface gratings ($SiO_2$), and a graphene sheet. The bottom Si layer was introduced as a transparent back electrode to gate the graphene. The $SiN_x$, the $SiO_2$, and the Si were assumed to be optically lossless media with refractive indices tabulated in E. D. Palik, et al., Handbook of optical constants of solids. (Academic Press, 1998) and G. Cataldo, et al., Opt. Lett. 2012, 37, 4200. The thicknesses of the $SiN_x$ and the bottom Si layers were optimized to produce a Fabry-Perot resonance at around freespace wavelength ($\lambda_0$) of 1.55 μm along the z-direction, as illustrated in FIG. 1B.

The surface gratings were dimerized in order to excite the qBIC resonance, and the perturbation was denoted as $\delta$, which determined the resonance's scattering rate. (A. C. Overvig et al., Nanophotonics 2018, 7, 1157; Q. J. Song, et al., Phys. Rev. A 2019, 100, 023810.) The graphene was gated by the bottom Si layer in order to manipulate the absorption rate of the qBIC resonance. The incoming light was at normal incidence, and the polarization was assumed to be transverse electric (TE). It guaranteed that all electric fields ($E_y$) were aligned with the graphene sheet regardless of the direction of the wavevector, so that light-matter interactions were maximized in the graphene.

Quasi-Bound States in the Continuum without Graphene

To examine the formation of the qBIC, the optical behavior of the proposed structure without graphene was first investigated. Along the suspended layers, two waveguide modes that propagate in opposite directions ($\pm k_x$) can be excited, which will create a standing-wave-like cavity mode inside the waveguide. In the absence of the surface gratings, this cavity mode cannot couple to the waves in freespace due to the lack of a radiative coupling channel. Even in the presence of the surface gratings, the cavity mode remained trapped perfectly in the waveguide unless the resonance mode supported by the surface gratings lies in the middle of the first Brillouin zone. The result of this radiatively-inaccessible cavity mode is illustrated by the case of zero perturbation (δ), as shown in FIG. 1B. This trapped cavity mode corresponds to a symmetry-protected BIC with an infinite Q-factor.

Figure 1C:
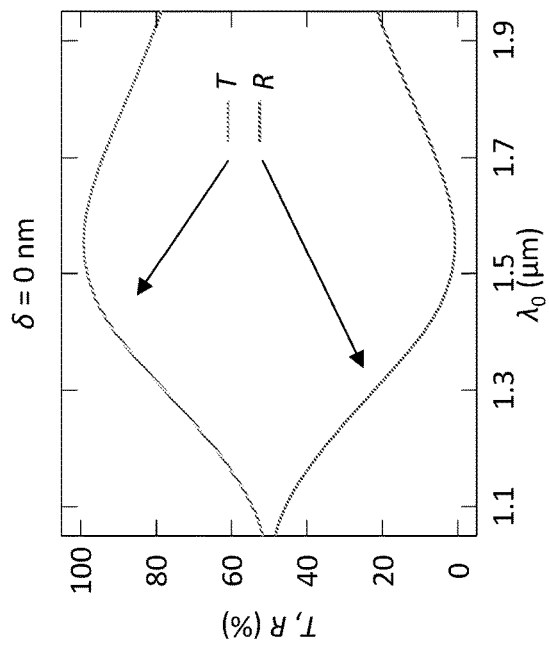
FIG. 1C shows transmission (T) and reflection (R) spectra displaying qBIC resonances with finite perturbations.

When finite perturbation along the surface gratings was introduced, the overall period of the surface gratings was doubled, and this led to Brillouin zone folding. (A. C. Overvig et al., 2018.) As a result, the guided-mode resonance due to surface gratings became accessible with normally incident freespace light. In other words, the perturbation opened up a radiative coupling channel for the guided mode resonance. Hence, it allowed the cavity mode to interact with the freespace radiation, turning it into a qBIC. As shown in FIG. 1C, high-Q resonances appeared at around $\lambda_0=1.55$ μm with the perturbations of 100 nm, 200 nm, and 300 nm, which correspond to 11.5%, 23.0%, and 34.5% of the period of the surface gratings (P=870 nm), respectively.

Figure 1D:
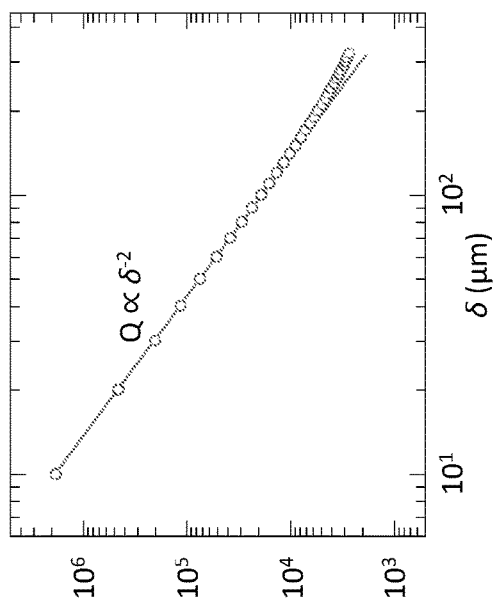
FIG. 1D shows the Q-factor of the qBIC resonance as a function of perturbation.
Figure 1E:
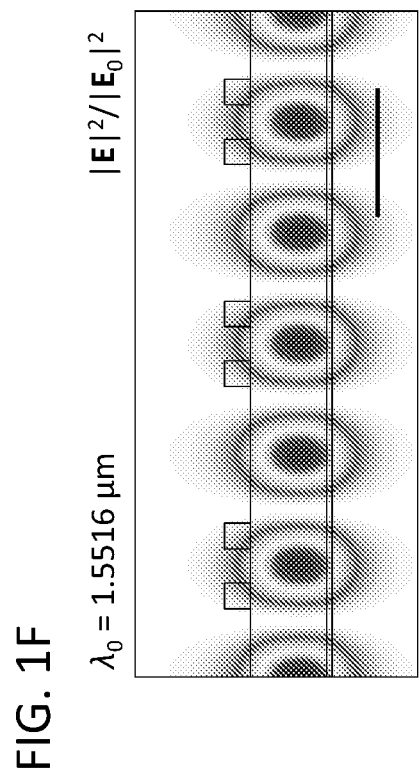
FIGS. 1E-1G show electric field intensity distributions ($|E|^2/|E_0|^2$) with $\delta=200$ nm (FIG. 1F) at the qBIC resonant wavelength and (FIGS. 1E, 1G) at off resonant wavelengths. The scale bars correspond to 500 nm. For the data in FIGS. 1B-1G, all calculations were performed without graphene.
Figure 1F:
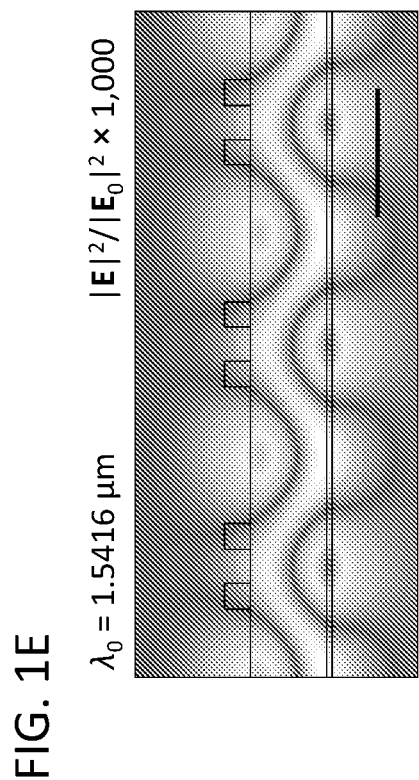
Figure 1G:
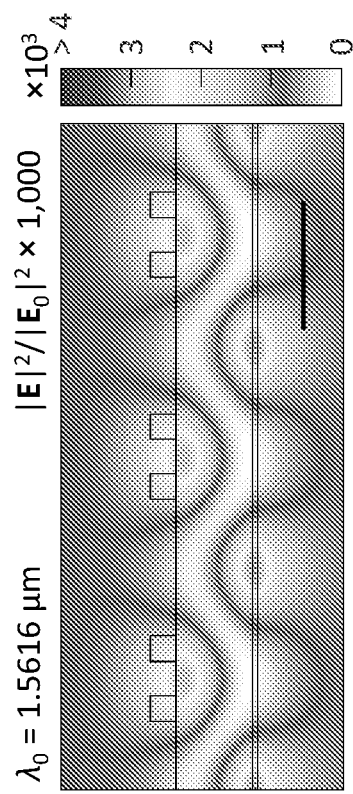

It was noted that the degree of the perturbation determined the scattering rate, or the Q-factor, of the resonances. As shown in FIG. 1D, smaller perturbations led to lower scattering rates and thus larger Q-factors proportional to $\delta^{-2}$, which is a general characteristic of the qBIC phenomena. The Q-factors were calculated by fitting the resonance spectra with the Fano formula. FIGS. 1E-1G show electric field intensity distributions ($|E|^2/|E_0|^2$) with δ=200 nm depending on the existence of the qBIC resonance. At the qBIC resonant wavelength (FIG. 1F), the electric field profile displays a standing-wave-like resonance with a significantly enhanced amplitude. In contrast, FIGS. 1E and 1G show that there is no strong field enhancement at off resonant frequencies. Here, it was noted that the amplitudes of the intensity in FIGS. 1E and 1G are multiplied by 1,000 to match the color map range of FIG. 1F.

Figure 2B:
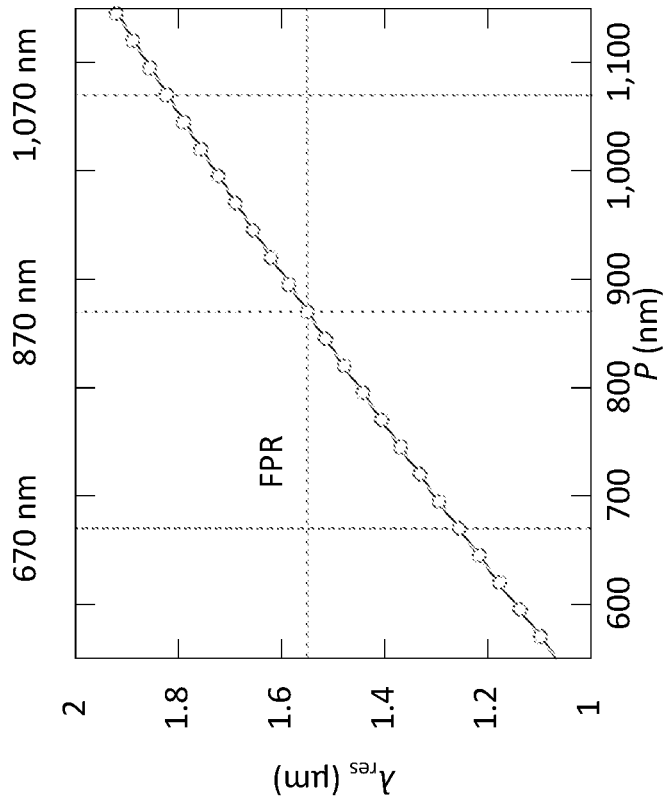
FIG. 2B shows the resonant wavelength ($\lambda_{res}$) as a function of the period of the surface gratings (P). The dashed line denotes the resonant wavelength of the Fabry-Perot resonance (FPR) presented in FIG. 1B.
Figure 2A:
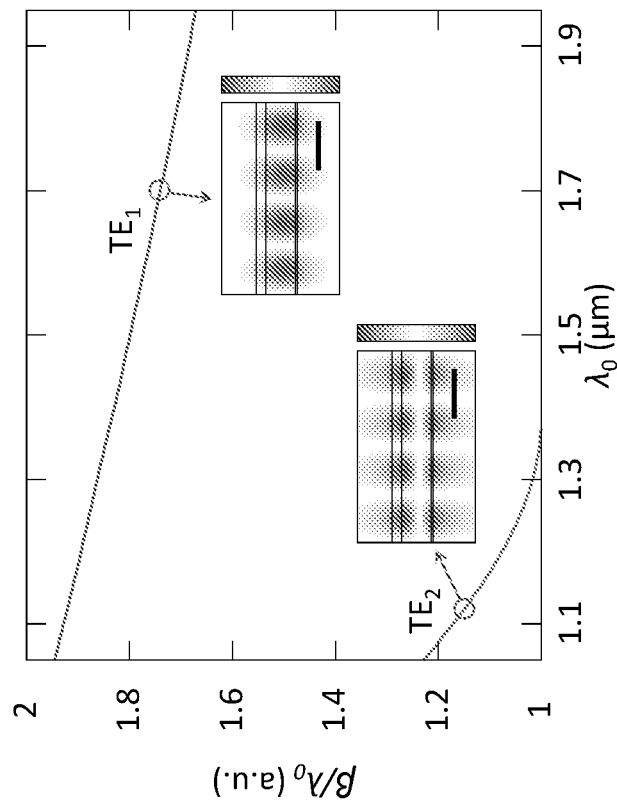
FIG. 2A shows propagation constants normalized by the freespace wavelength ($\beta/\lambda_0$) of the guided modes along the suspended waveguide structure. The insets illustrate the representative electric field distributions ($\mathrm{Re}(E_y)$) of the $TE_1$ mode (middle right) and the $TE_2$ mode (bottom left). The scale bars correspond to 500 nm.

Since the qBIC resonance in this configuration was based on a guided-mode resonance phenomenon excited by the surface gratings, the resonant wavelength ($\lambda_{res}$) was structurally tunable by adjusting the period of the surface gratings (P). The resonant wavelength with a given surface grating period can be estimated by evaluating the dispersion of the waveguide mode. FIG. 2A presents the propagation constants normalized by freespace wavelengths ($\beta/\lambda_0$) along the suspended waveguide as a function of freespace wavelength. In this dispersion, two modes ($TE_1$ and $TE_2$) existed inside the waveguide, and only the $TE_1$ mode was considered to excite the qBIC resonance. To calculate the dispersion, the surface gratings were modeled by a 100-nm-thick homogeneous layer with an effective refractive $$\text{index of } \sqrt{\frac{2W}{P}\varepsilon_{SiO_2} - \left(1 - \frac{2W}{P}\right)},$$

where W and $\varepsilon_{SiO_2}$ are the width and the permittivity of the surface gratings, respectively. (B. C. Sturmberg, et al., *Opt Express* 2015, 23, A1672.)

With the given normalized propagation constants, the 1$^{st}$ order resonant wavelengths ($\lambda_{res}$) can be estimated by finding out the freespace wavelengths satisfying $\lambda_0=\beta(\lambda_0)P/\lambda_0$. The estimated resonant wavelengths (solid lines) are shown in FIG. 2B as a function of the period of the surface gratings, and it showed good agreement with the calculated resonant wavelengths from full-wave simulations (circles).

Figure 2D:
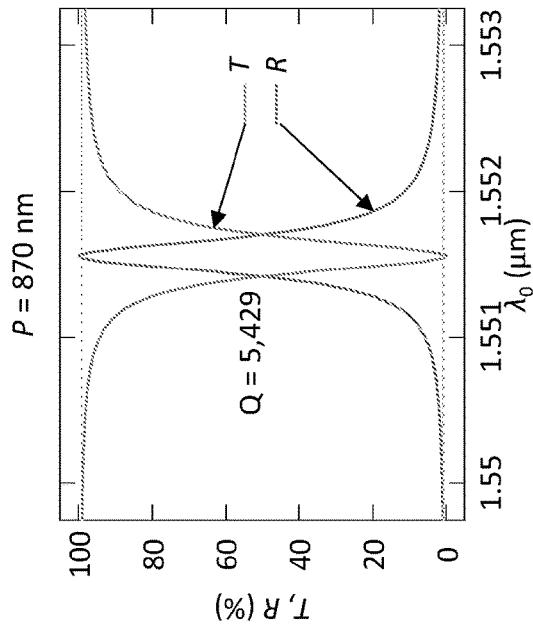
FIGS. 2C-2E show transmission (T) and reflection (R) spectra displaying different resonance wavelengths as the period of the surface gratings (P) is varied with $\delta=200$ nm. The dashed lines correspond to the background spectra with zero perturbation in FIG. 1B. For the data in FIGS. 2A-2E, all calculations were performed without graphene.
Figure 2C:
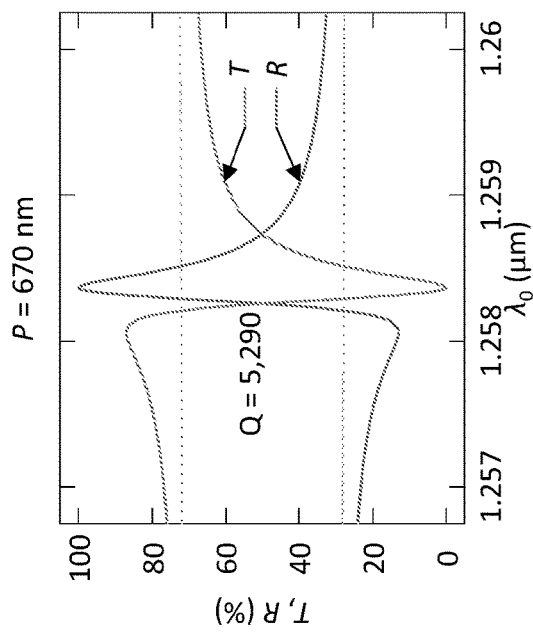
Figure 2E:
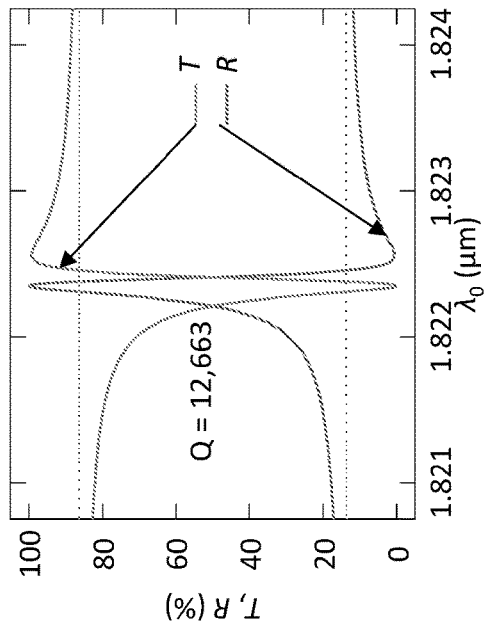

As illustrated in FIG. 1B, the thicknesses of the suspended layers were optimized to support a Fabry-Perot resonance along the z-direction so that the transmission and the reflection were near unity and zero, respectively, at around $\lambda_0=1.55$ μm. When the guided-mode resonance existed along with the Fabry-Perot resonance, the interactions of the two resonances ended up creating a Fano resonance due to the large difference in their lifetimes. (M. F. Limonov, et al., *Nat. Photonics* 2017, 11, 543.) As shown in FIGS. 2C and 2E, the general asymmetric form of the Fano resonances were displayed when the guided-mode resonances and the Fabry-Perot resonances were misaligned. With P=670 nm (FIG. 2C) and P=1,070 nm (FIG. 2E), the resonant wavelengths of the guided mode resonances were located at $\lambda_0=1.257$ μm and $\lambda_0=1.825$ μm, respectively, while the Fabry-Perot resonance existed at $\lambda_0=1.552$ μm, as shown in FIG. 2B. The dashed lines in FIGS. 2C-2E correspond to the background spectra in the case of zero perturbation in FIG. 1B. On the other hand, the resonance follows a Lorentzian line shape if the qBIC resonance is located at the maximal point of the Fabry-Perot resonance due to the matching phase signs to the left and the right of the resonance wavelength with P=870 nm, as shown in FIG. 2D. Indeed, the Lorentzian profile arises from the infinite Fano parameter (q) of the Fano formula. In this case, the overall reflection and transmission responses were dominantly governed by the indirect coupling pathway through guided-mode resonance, while the Fabry-Perot resonance provided a background transmission of unity with vanishing reflection. (M. F. Limonov, et al., 2017.) As a result, the transmission and the reflection spectra dropped from near unity to almost zero and vice versa simultaneously at the qBIC resonance, providing maximal modulation potential.

The suspended waveguide and the surface gratings were assumed to be lossless, which means the Q factors presented in FIGS. 1A-1G and FIGS. 2A-2E were solely governed by the scattering rates. In addition, the high-Q factors indicate that the finite scattering rates derived from the perturbations still remained relatively low. This implies that while the resonances are in an overcoupled regime, they would be extremely sensitive to another damping channel. Therefore, the resonances will easily become undercoupled even with a small absorption rate, collapsing the qBIC modes. This would grant the capability of large active modulation in both the transmission and the reflection simultaneously.

Gate-Dependent Quasi-Bound States in the Continuum with Graphene

When graphene was placed onto the $SiN_x$ layer and the graphene was gated, as illustrated in FIG. 1A, tunable absorption rates could be introduced. FIG. 3A shows the gate-dependent graphene conductivities (σ) at $\lambda_0=1.551$ μm with a graphene carrier mobility (μ) of 10,000 $cm^2V^{-1}s^{-1}$. The graphene conductivity consists of an interband term ($\sigma_{inter}$) and an intraband term ($\sigma_{intra}$), and the conductivities were evaluated by the random phase approximation in the local limit. (G. W. Hanson. *J. Appl. Phys.* 2008, 103, 064302; L. A. Falkovsky. *J. Phys. Conf. Ser.* 2008, 129, 012004.) Here, the overall Re(a) determined the absorption in graphene, and the resonance position, or the resonant wavelength, was slightly affected by the Im(σ). (S. Kim, et al., *Nano Lett.* 2018, 18, 971.) As shown in FIG. 3A, the $Re(\sigma_{inter})$ started decreasing at around $E_F=\hbar\omega/2$ due to the Pauli blocking, where $E_F$ and ħω corresponded to the graphene Fermi level and the photon energy, respectively. Due to the drastic reduction in the interband transition, the absorption at high graphene Fermi levels mainly came from the $Re(\sigma_{intra})$.

Figure 3B:
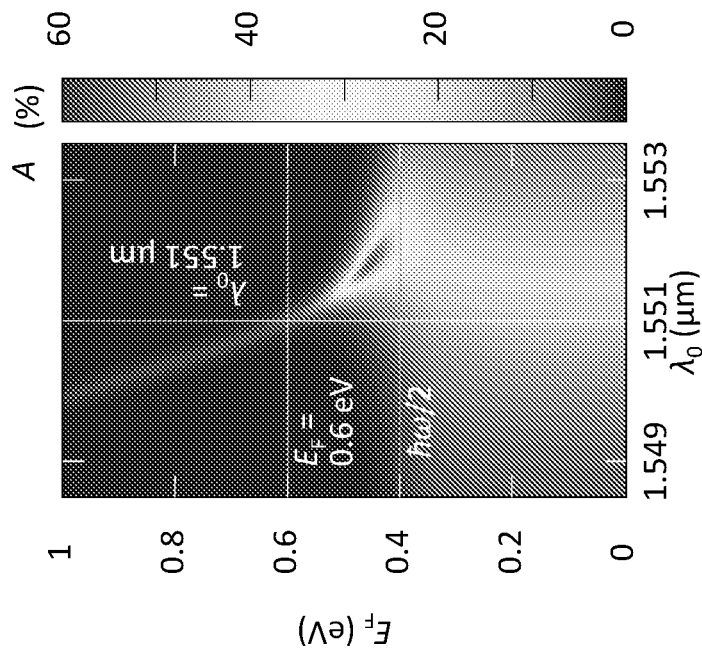
FIG. 3B shows gate-dependent absorption (A)
Figure 3A:
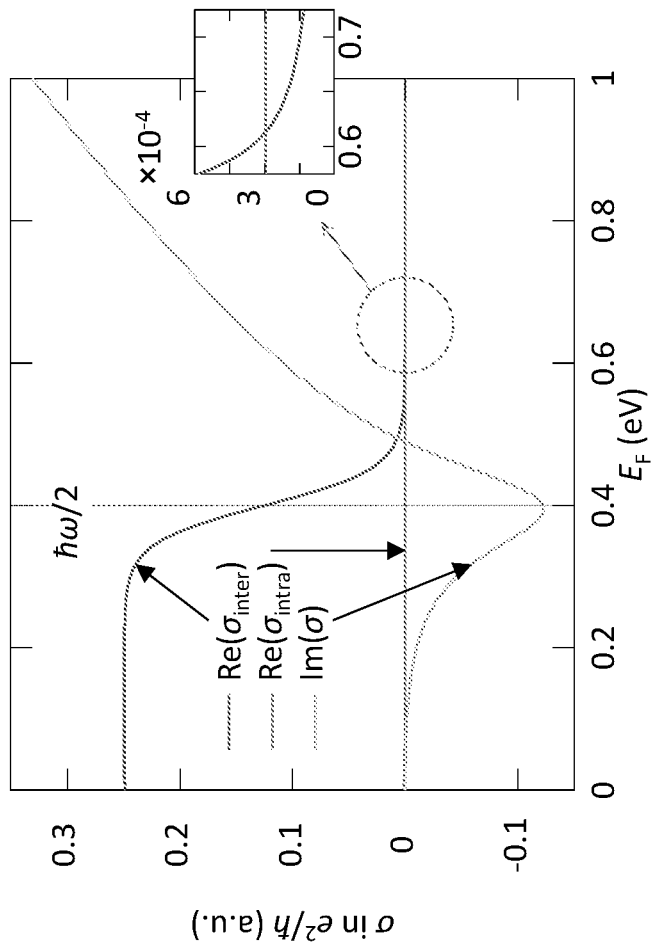
FIG. 3A shows gate-dependent graphene conductivity ($\sigma$) normalized by $e^2/\hbar\omega$ at $\lambda_0=1.551$ μm. The graphene carrier mobility is assumed to be 10,000 $\mathrm{cm^2V^{-1}s^{-1}}$. The $\sigma_{inter}$ and the $\sigma_{intra}$ correspond to the interband graphene conductivity and the intraband graphene conductivity, respectively.
Figure 3D:
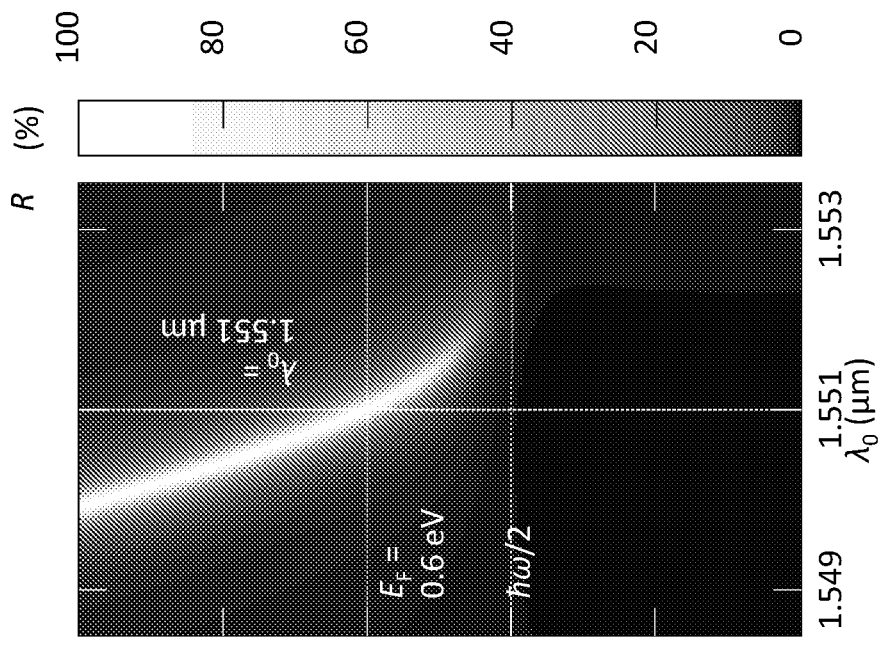
FIG. 3D shows reflectance (R) maps as a function of 0.10.
Figure 3C:
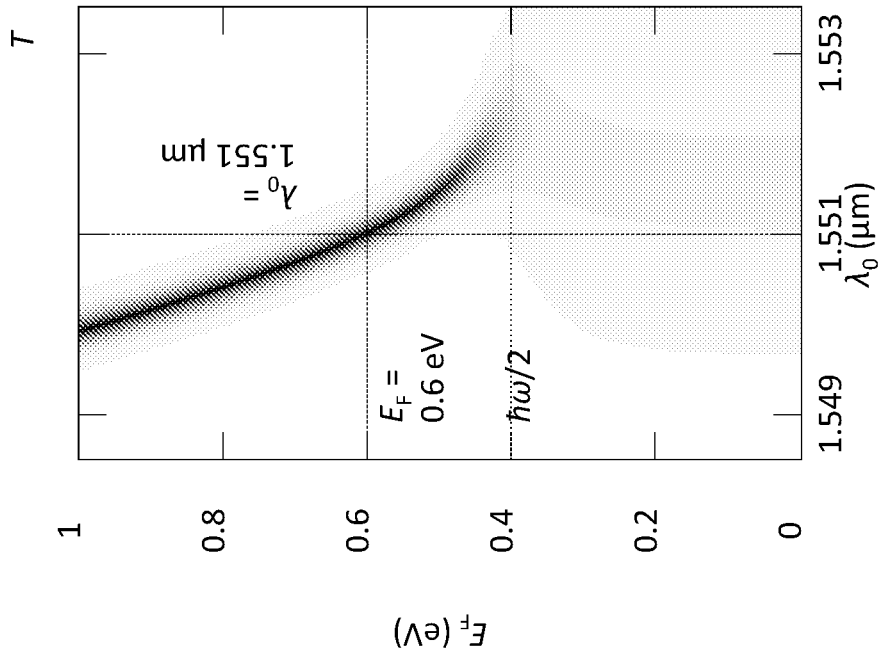
FIG. 3C shows transmittance (T)

Gate-dependent absorption (A), transmittance (T), and reflectance (R) maps are presented in FIGS. 3B-3D. Below $E_F=\hbar\omega/2$, it is clearly shown that the resonance was weakened significantly and the linewidth became very broad due to the large absorption rate from the interband absorption in graphene. In particular, the resonance in the reflection almost vanished. The high-Q resonance was restored above $E_F=\hbar\omega/2$ in both the transmission and the reflection as the interband absorption in graphene was suppressed. The small shift in the resonant wavelength was due to the gate-dependent Im($\sigma$) of graphene.

Figure 3E:
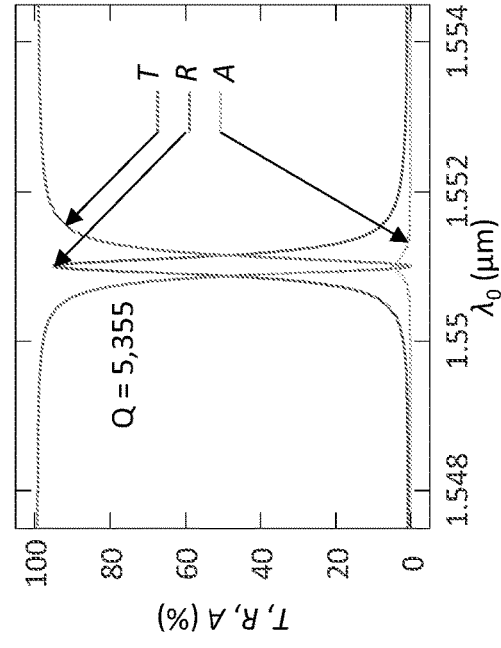
FIGS. 3E-3F show (FIG. 3E) T, R, and A spectra at $E_F=0$ eV and (FIG. 3F) at $E_F=0.6$ eV.
Figure 3F:
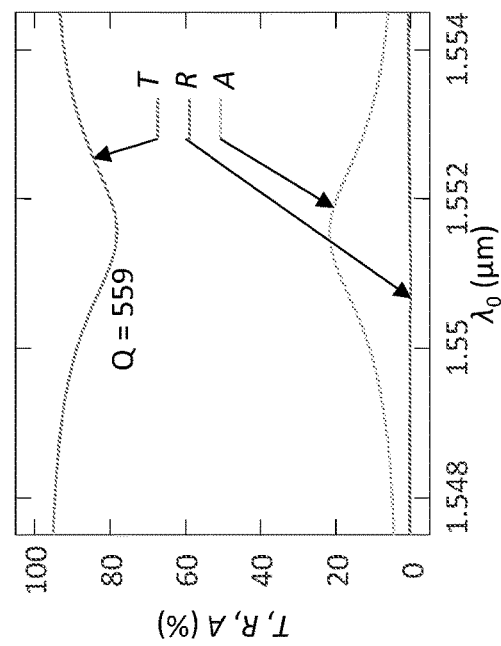

The transmission, the reflection, and the absorption spectra at $\lambda_0=1.551$ μm are presented in FIGS. 3E and 3F with and without the interband absorption in graphene. It is clearly displayed that the overall absorption at $E_F=0$ eV was much larger than that at $E_F=0.6$ eV. It indicates that the linewidth and the oscillator strengths of the resonance were strongly affected by the absorption in graphene. As the absorption in graphene overwhelmed the scattering rate of the qBIC resonance, the qBIC resonance became strongly undercoupled, losing its ability to significantly alter the transmission and reflection responses.

However, it cannot be concluded that the qBIC resonance disappears at $E_F=0$ eV simply due to the large absorption in graphene. As shown in FIG. 3B, the absorption at $E_F=0.457$ eV was larger than that at $E_F=0$ eV, although the Q-factor of the former was higher than that of the latter. This situation happens because the absorption rate is governed by the non-resonant absorption from the interband transition in graphene instead of the total absorption at the resonance, as will be described theoretically below.

Figure 3G:
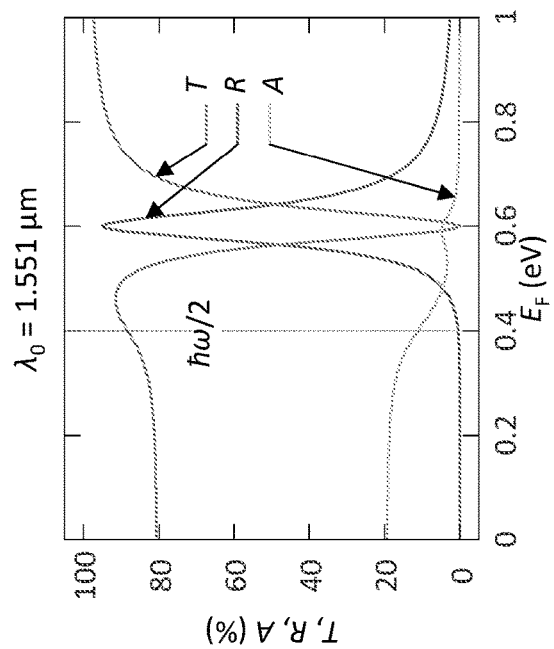
FIG. 3G shows gate-dependent T, R, and A at $\lambda_0=1.551$ μm.

FIG. 3G shows the gate-dependent transmittance, reflectance, and absorption at $\lambda_0=1.551$ μm. The transmittance and the reflectance changed rapidly after $E_F=\hbar\omega/2$ due to the interband transition in graphene. Their gate-dependent modulation efficiencies ($\eta_T$, $\eta_R$) were both 99.9%, where the efficiencies were calculated by $\eta_T=1-T_{min}/T_{max}$ and $\eta_R=1-R_{min}/R_{max}$. In these modulation efficiency calculations, the graphene Fermi levels were limited to be within 0.6 eV, which is a reasonably accessible doping level in an electrostatic gating method. (S. Kim, et al., *Nat. Commun.* 2016, 7, 12323; S. Kim, et al., *Nano Lett.* 2018, 18, 971; S. Han, et al., *ACS Nano* 2020, 14, 1166.) After $E_F=0.6$ eV, the transmittance and the reflectance transited rapidly again due to the blueshift arising from the gate-dependent Im($\sigma$).

In realistic materials, there could be some intrinsic absorption in the dielectric layers ($SiO_2$, $SiN_x$, and Si). To consider the loss effect, the spectra were calculated with finite k values, or the imaginary parts of the refractive indices, ranging from $10^{-6}$ to $10^{-3}$. When the k was equal to or below $10^{-5}$, the qBIC resonances were still strong and narrow because the scattering rate overwhelmed the absorption rate from the finite k. However, the oscillator strength started decreasing with $k=10^{-4}$, and the qBIC resonance was suppressed with $k=10^{-3}$ due to the large absorption in the dielectric layers. Considering the k values of the materials are in the order of $10^{-5}$ or $10^{-6}$ at telecom frequencies, the proposed structure will support the qBIC resonance robustly.

Analysis on Absorption and Scattering Rates

To investigate the effect of the absorption on the qBIC resonance, the spectra were analyzed with the temporal coupled mode theory (TCMT). (S. Fan, et al., *J. Opt. Soc. Am. A* 2003, 20, 569; W. Suh, et al., *IEEE J. Quantum Electron.* 2004, 40, 1511.) In this analysis, it was assumed that the resonant features were dictated by the guided-mode resonance exclusively, and the Fabry-Perot resonance and the interband absorption in graphene determined the non-resonant responses, or the background signals. Then, the absorption rate and the scattering rate from the spectra can be readily evaluated.

Figure 4B:
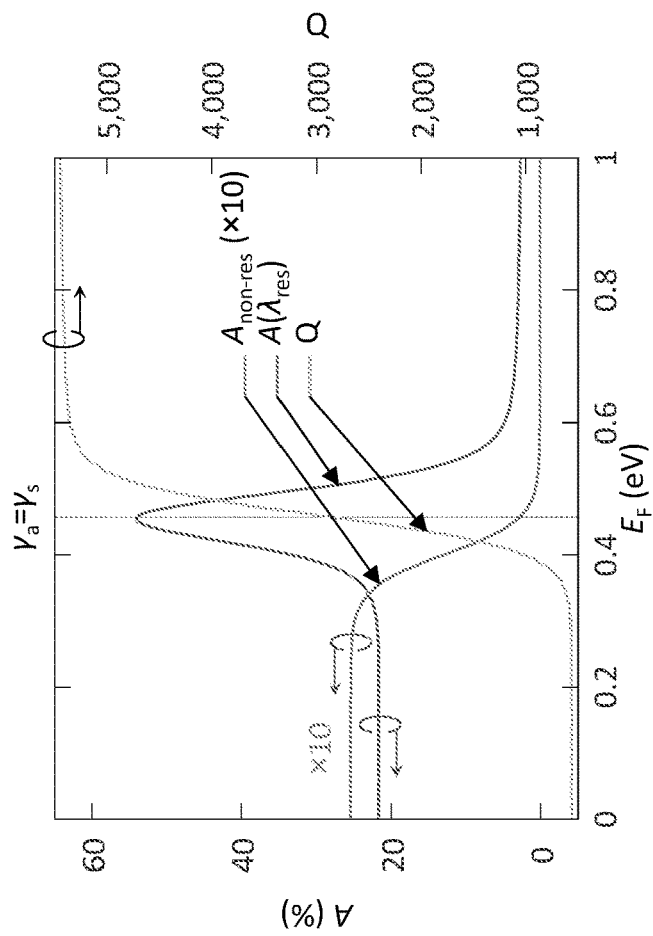
FIG. 4B shows gate-dependent non-resonant absorption ($A_{non-res}$), absorption along the resonant wavelength ($A(\lambda_{res})$), and the Q-factor.
Figure 4A:
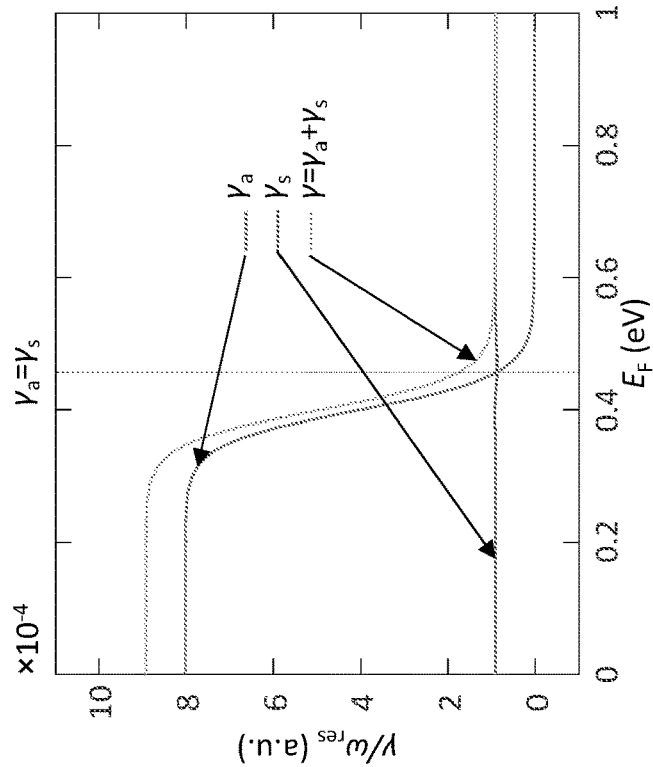
FIG. 4A shows gate-dependent absorption rate ($\gamma_a$), scattering rate ($\gamma_s$), and the damping rate ($\gamma$).

FIG. 4A shows the absorption rate ($\gamma_a$) and the scattering rate ($\gamma_s$) calculated by the TCMT, and the corresponding Q-factor as a function of graphene Fermi levels. As expected, it can be seen that the absorption rate overwhelmed the scattering rate below $E_F=\hbar\omega/2$ due to the large interband absorption in graphene, which collapsed the excitation of the qBIC. After $E_F=\hbar\omega/2$, the absorption rate diminished significantly, and the scattering rate dominantly governed the resonance and high Q-factors were retained. In particular, the scattering rate was almost constant along the graphene Fermi levels, as shown in FIG. 4A. It indicates that the radiative coupling channel of the qBIC resonance always remains open regardless of the interband absorption in graphene, but the excitation of the qBIC resonance is largely affected by the interband absorption in graphene.

FIG. 4B shows that the Q-factor is in inverse proportion to the non-resonant absorption ($A_{non-res}$), which exactly follows the Re($\sigma_{inter}$) in FIG. 3A. Here, the non-resonant absorption, associated with the background absorption independent of the qBIC resonance, was calculated by fitting the absorption spectra with the Fano formula. This implies that the absorption rate is dictated by the non-resonant absorption until the interband absorption in graphene is suppressed enough. In this way, it is clearly confirmed that the gate-tunable interband absorption can be exploited to modulate the qBIC resonance electrically.

In addition to the role of the interband absorption in graphene, the TCMT analysis shines light on the critical coupling of the qBIC resonance. As shown in FIG. 4B, the overall absorption is maximized at around $E_F=0.457$ eV. At this graphene Fermi level, the absorption rate and the scattering rate cross each other, as shown in FIG. 4A. This condition corresponds to the condition of critical coupling where the absorption loss and the scattering loss are balanced, and it leads to maximizing the overall absorption in the system. At this critical coupling condition, perfect absorption can be achieved if the transmission is blocked with a back reflector. In this case, the effective impedance of the structure became unity when the scattering loss and the resistive loss were equal, and it resulted in zero reflection with perfect absorption. This implies that a qBIC resonance supported in a nanophotonic structure with a back reflector can be employed to facilitate electrical tunable perfect absorption.

Dependency on Graphene Carrier Mobility

One last question that remains is whether the electrical modulation of the qBIC resonance is achievable with low quality graphene. It is well known that high graphene carrier mobility is desirable to enhance light-matter interactions in graphene. In particular, the graphene carrier mobility primarily dictates the oscillator strengths of graphene plasmons in the mid-infrared. Although very high graphene carrier mobilities (>10,000 $cm^2V^{-1}s^{-1}$) are available in exfoliated graphene, such large values are not easily obtained in CVD-grown graphene, which is preferable for large scale optical devices.

Unlike graphene plasmonic devices, the graphene in the proposed structure is not incorporated to support resonances or to maximize tunable absorption. Instead, the graphene is employed to engineer the absorption rate of the qBIC resonance which already exists in the structure independent from the graphene. Therefore, it can be expected that the switching performance is not significantly degraded with low graphene carrier mobilities.

Figure 5B:
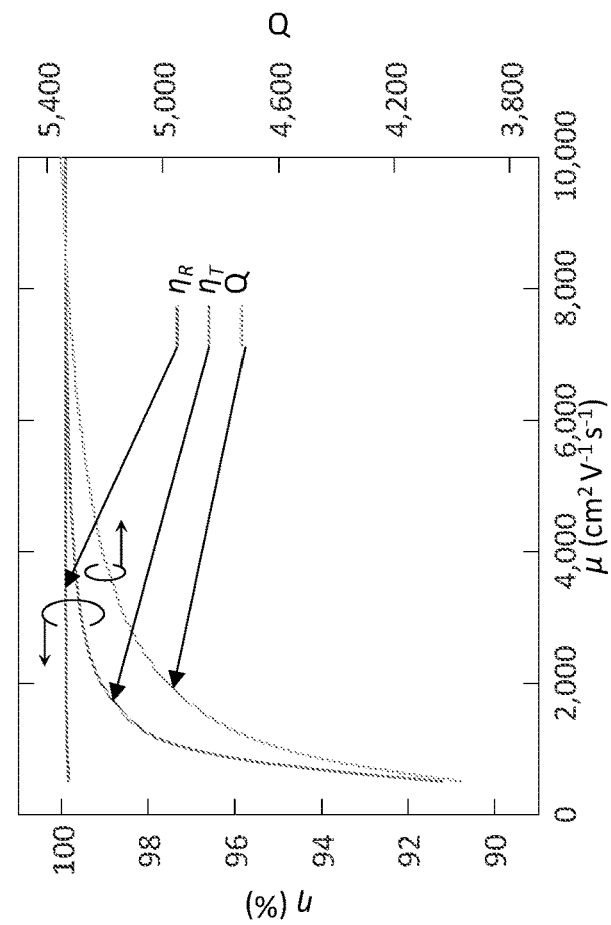
FIG. 5B shows transmission efficiency ($\eta_T$), reflection efficiency ($\eta_R$), and Q-factor at $E_F=0.6$ eV as a function of the graphene carrier mobility (μ).
Figure 5A:
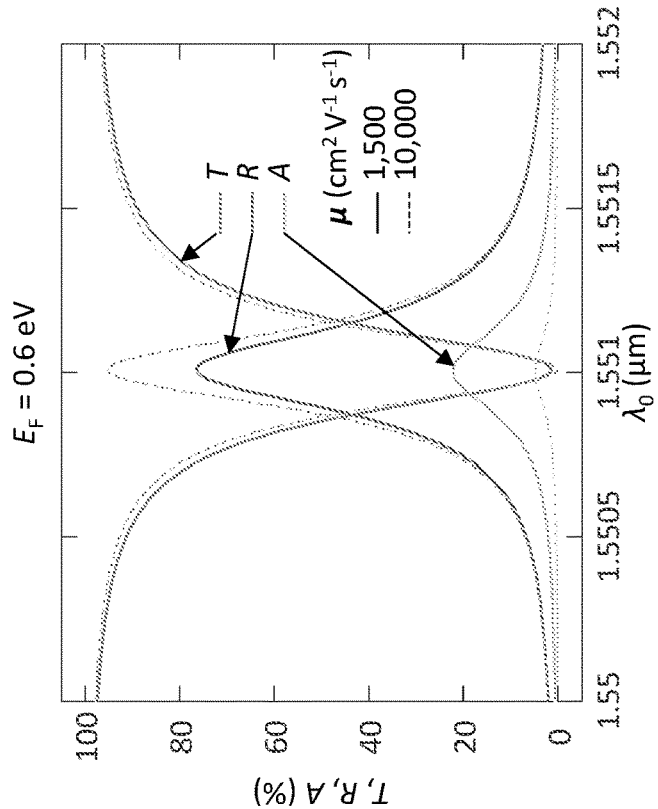
FIG. 5A shows transmission (T), reflection (R), and absorption (A) spectra at $E_F=0.6$ eV with different graphene carrier mobilities (μ).

FIG. 5A shows the qBIC resonance spectra with the graphene carrier mobility $\mu=1,500$ cm$^2$V$^{-1}$s$^{-1}$ at $E_F=0.6$ eV when the interband absorption in graphene was suppressed. The spectra at $E_F=0$ eV was identical with the spectra in FIG. 3B, where the Re($\sigma_{inter}$) governed the overall absorption in graphene, because the Re($\sigma_{inter}$) was nearly independent of the graphene carrier mobility. On the other hand, the Re($\sigma_{intra}$) was inversely proportional to the graphene carrier mobility. Therefore, the intraband absorption in graphene increased when the graphene carrier mobility decreased. As a result, the overall absorption with $\mu=1,500$ cm$^2$V$^{-1}$s$^{-1}$ was slightly higher than that with $p=10,000$ cm$^2$V$^{-1}$s$^{-1}$, as shown in FIG. 5A.

Due to the larger intraband absorption in graphene, or the larger absorption rate, FIG. 5A displays that the oscillator strength decreased and the resonance broadened slightly with the reduced graphene carrier mobility. However, the deep resonance was restored successfully by suppressing the interband absorption in graphene, and the linewidth was sufficiently narrow, as shown in FIG. 5A.

The modulation efficiencies of the transmission and the reflection and their Q-factors are presented in FIG. 5B as the graphene carrier mobility was varied. In this calculation, the resonant wavelengths were chosen to maximize the modulation efficiencies with $E_F=0.6$ eV, and the Q-factors were evaluated at the resonant wavelengths with $E_F=0.6$ eV. As shown in FIG. 5B, very large modulation efficiencies over 91% were achievable in both the transmission and the reflection simultaneously even with very low graphene carrier mobility ($\mu=500$ cm$^2$V$^{-1}$s$^{-1}$). This result suggests that the proposed strategy to modulate the qBIC resonance is not limited by low graphene carrier mobilities.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" can mean only one or can mean "one or more." Embodiments of the inventions consistent with either construction are covered.

The foregoing description of illustrative embodiments of the invention has been presented for purposes of illustration and of description. It is not intended to be exhaustive or to limit the invention to the precise form disclosed, and modifications and variations are possible in light of the above teachings or may be acquired from practice of the invention. The embodiments were chosen and described in order to explain the principles of the invention and as practical applications of the invention to enable one skilled in the art to utilize the invention in various embodiments and with various modifications as suited to the particular use contemplated. It is intended that the scope of the invention be defined by the claims appended hereto and their equivalents.

What is claimed is:

1. A dielectric resonator comprising:
   a waveguide comprising a planar dielectric slab; and
   a periodic grating on the planar dielectric slab, wherein the waveguide supports a vertical Fabry-Perot resonance and the periodic grating supports a qBIC resonance, the supported qBIC resonance having a qBIC resonant frequency corresponding to a peak in the transmission spectrum of the Fabry-Perot resonance; and
   an electronically gated or thermally gated absorber material on a surface of the dielectric slab, the absorber material having an electrically tunable absorption at the qBIC resonant frequency.

2. The resonator of claim 1, wherein the qBIC resonance has a resonant wavelength in the range from 1 μm to 2 μm.

3. The resonator of claim 1, wherein the absorber material is electrically gated.

4. The resonator of claim 3, wherein the absorber material is graphene.

5. The resonator of claim 4, wherein the graphene is chemical vapor deposited graphene.

6. The resonator of claim 1, wherein the planar dielectric slab is a silicon nitride slab.

7. The resonator of claim 6, wherein the waveguide further comprises a silicon electrode adjacent to a surface of the silicon nitride slab opposite the absorber material.

8. The resonator of claim 7, wherein periodic grating comprises dimerized silicon oxide grating elements.

9. The resonator of claim 8, wherein the absorber material is graphene.

10. The resonator of claim 1, wherein the absorber material is selected from indium tin oxide, vanadium dioxide, germanium-antimony-tellurium, indium zinc oxide, and titanium nitride.

11. A method for modulating the intensity of monochromatic radiation using a dielectric resonator comprising:
    a waveguide comprising a planar dielectric slab; and
    a periodic grating on the planar dielectric slab, wherein the waveguide supports a vertical Fabry-Perot resonance and the periodic grating supports a qBIC resonance, the supported qBIC resonance having a qBIC resonant frequency corresponding to a peak in the transmission spectrum of the Fabry-Perot resonance; and
    an electronically gated or thermally gated absorber material on a surface of the dielectric slab, the absorber material having an electrically tunable absorption at the qBIC resonant frequency,
    the method comprising:
    illuminating the waveguide with free space radiation at normal incidence to excite the vertical Fabry-Perot resonance and a lateral guided mode resonance at the qBIC resonant frequency, wherein the lateral guided mode resonance and the vertical Fabry Perot resonance couple to produce a Fano resonance having a Lorentzian line shape with a minimum transmittance and a maximum reflectance at the qBIC resonant frequency; and
    adjusting a gate bias on the electronically gated absorber material or a temperature of the thermally gated absorber material to modulate the intensity of the qBIC resonance.

12. The method of claim 11, wherein the absorber material is electronically gated.

13. The method of claim 12, wherein adjusting the gate bias modulates the intensity of transmission at the qBIC resonant frequency from 100% to 0%.

14. The method of claim 11, wherein the absorber material is thermally gated.

* * * * *